US009194758B2

(12) United States Patent
Mazzaro et al.

(10) Patent No.: US 9,194,758 B2
(45) Date of Patent: Nov. 24, 2015

(54) VIRTUAL SENSOR SYSTEMS AND METHODS FOR ESTIMATION OF STEAM TURBINE SECTIONAL EFFICIENCIES

(75) Inventors: Maria Cecilia Mazzaro, Greenville, SC (US); Fernando Javier D'Amato, Niskayuna, NY (US); Jitendra Kumar, Atlanta, GA (US); Vivek Venugopal Badami, Niskayuna, NY (US); Mahalakshmi Shunmugham Balasubramaniam, Karnataka (IN); Roopesh Bhaskaran Nagathil, Smyrna, GA (US)

(73) Assignee: General Electric Company, Schenectady, NY (US)

(*) Notice: Subject to any disclaimer, the term of this patent is extended or adjusted under 35 U.S.C. 154(b) by 995 days.

(21) Appl. No.: 13/163,979

(22) Filed: Jun. 20, 2011

(65) Prior Publication Data

US 2012/0323530 A1    Dec. 20, 2012

(51) Int. Cl.
| | |
|---|---|
| *G06F 3/01* | (2006.01) |
| *G01L 7/18* | (2006.01) |
| *G01L 15/00* | (2006.01) |
| *G06F 7/02* | (2006.01) |
| *G01L 3/26* | (2006.01) |
| *F01D 17/08* | (2006.01) |
| *F02C 1/06* | (2006.01) |
| *F01K 7/04* | (2006.01) |

(Continued)

(52) U.S. Cl.
CPC . *G01L 3/26* (2013.01); *F01D 17/08* (2013.01); *F01K 7/04* (2013.01); *F01K 7/22* (2013.01); *F01K 13/02* (2013.01); *F02C 1/06* (2013.01)

(58) Field of Classification Search
CPC .................................. F01D 1/00; G06F 15/00
USPC ............ 702/50, 182; 415/1, 118; 60/39, 182, 60/650
See application file for complete search history.

(56) References Cited

U.S. PATENT DOCUMENTS

| | | | | |
|---|---|---|---|---|
| 3,588,265 | A * | 6/1971 | Berry | 415/17 |
| 4,005,581 | A * | 2/1977 | Aanstad | 60/660 |
| 4,891,948 | A * | 1/1990 | Kure-Jensen et al. | 60/645 |

(Continued)

OTHER PUBLICATIONS

Caudill et al "Analysis of Leakage Between HP and IP turbines Using PEPSE", Presented at Scientech 1990 Users Group Meeting, 1990.*

(Continued)

*Primary Examiner* — Eliseo Ramos-Feliciano
*Assistant Examiner* — Felix Suarez
(74) *Attorney, Agent, or Firm* — Ernest G. Cusick; Hoffman Warnick LLC

(57) ABSTRACT

Systems and methods of estimating an efficiency of a section of a steam turbine are disclosed. The systems and methods include determining a set of measurement data obtained directly from a set of sensors on the steam turbine, determining a set of derived data relating to measurements that cannot be obtained directly from the set of sensors, and estimating the efficiency of the section using the set of measurement data and the set of derived data. The systems and methods disclosed use physics-based models combined with nonlinear filtering techniques to estimate steam turbines' efficiencies when physical sensors are not available. These models capture the behavior of different components of the power plant, including all steam turbine sections, admission and crossover pipes, flow junctions, admission and control valves.

20 Claims, 2 Drawing Sheets

(51) Int. Cl.
*F01K 7/22* (2006.01)
*F01K 13/02* (2006.01)

(56) References Cited

U.S. PATENT DOCUMENTS

| | | | |
|---|---|---|---|
| 5,411,365 A * | 5/1995 | Mazzola et al. | 415/93 |
| 7,021,126 B1 | 4/2006 | Badami et al. | |
| 7,658,073 B2 * | 2/2010 | Hernandez et al. | 60/677 |
| 7,661,327 B2 | 2/2010 | Bourgein et al. | |
| 8,113,764 B2 * | 2/2012 | Hernandez et al. | 415/1 |
| 8,200,369 B2 * | 6/2012 | Cheng et al. | 700/287 |
| 2005/0182576 A1 * | 8/2005 | Smith | 702/45 |
| 2006/0053872 A1 * | 3/2006 | Badami et al. | 73/112 |
| 2007/0104306 A1 * | 5/2007 | Umezawa et al. | 376/317 |
| 2008/0208429 A1 * | 8/2008 | Saravanapriyan et al. | 701/100 |
| 2010/0038917 A1 * | 2/2010 | DiAntonio et al. | 290/4 C |
| 2011/0038712 A1 * | 2/2011 | Yang | 415/118 |

OTHER PUBLICATIONS

Caudill et al "Analysis of Leakage Between HP and IP turbines Using PEPSE", Presented at Scientect 1990 Users Group Meeting, 1990.*

* cited by examiner

VIRTUAL SENSOR SYSTEMS AND METHODS FOR ESTIMATION OF STEAM TURBINE SECTIONAL EFFICIENCIES

BACKGROUND OF THE INVENTION

The subject matter disclosed herein relates to steam turbines and, more particularly, to virtual sensor systems and methods for low cost estimation of sectional efficiencies of steam turbines.

Large steam turbine-generator systems represent major capital investments for their owners and their economic benefit to their owners varies with the thermal efficiency with which the steam turbines are operated. Owners of large steam turbine generators are vitally interested in maintaining the operating parameters of the system as close as possible to the optimum set of operating parameters as designed for the system and/or developed during operational testing following initial installation of the system. In addition, degradation in performance over time can occur due to deterioration of internal parts and other operational causes.

Generally steam turbines are instrumented for controls and protection purposes. However, the standard instrumentation suite for steam turbines often does not include the instrumentation (sensors for temperature, pressure, flow etc.) required for performance measurement on a continuous basis. Therefore, users typically get a periodic snapshot (mostly once a year) using costly precision instrumentation and resources. This also restricts the normal power generation from a steam turbine, and therefore the power plant, because of the isolation and procedural requirements of the precision test.

BRIEF DESCRIPTION OF THE INVENTION

Systems and methods of estimating an efficiency of a section of a steam turbine are disclosed. The systems and methods include determining a set of measurement data obtained directly from a set of sensors on the steam turbine, determining a set of derived data relating to measurements that cannot be obtained directly from the set of sensors, and estimating the efficiency of the section using the set of measurement data and the set of derived data. The methods disclosed use physics-based models combined with nonlinear filtering techniques to estimate steam turbines' efficiencies when all desired physical sensors are not available. These models capture the behavior of different components of the power plant, including steam turbine sections, admission and crossover pipes, flow junctions, admission and control valves.

A first aspect of the invention provides a system comprising: at least one computing device configured to estimate an efficiency of a section of a steam turbine by performing actions including: determining a set of measurement data obtained directly from a set of sensors on the steam turbine, wherein the measurement data includes: a steam temperature and pressure at a first section inlet, a steam temperature and pressure at a second section inlet, a metal temperature at a second section outlet and a steam temperature and pressure at a third section admission pipe; determining a set of derived data relating to measurements that cannot be obtained directly from the set of sensors, wherein the set of derived data includes: a first section main steam flow, a second section main steam flow, a packing steam flow, a third section admission pipe steam flow, a steam pressure and temperature at the first section outlet, a steam temperature and a crossover pipe pressure at the second section outlet; and estimating the efficiency of the second section using the set of measurement data and the set of derived data.

A second aspect of the invention provides a system comprising: at least one computing device configured to estimate an efficiency of an intermediate pressure (IP) section of a steam turbine by performing actions including: receiving measured data from at least one sensor on the steam turbine, wherein the measured data includes: a steam temperature and pressure at a high pressure (HP) section inlet, a metal temperature at an IP section outlet; a steam temperature and pressure at an IP section inlet, and a steam temperature and pressure at a low pressure (LP) section admission pipe; using at least one algorithm to calculate at least one of the following: an HP section main steam flow, an IP section main steam flow, a packing steam flow, an IP section admission steam flow, a steam pressure and temperature at the HP section outlet, a crossover pipe steam temperature and a crossover pipe pressure at the IP section outlet; and calculating an estimated IP efficiency of the IP section using the measured data from the sensors and the calculated values from the at least one algorithm, wherein the estimated IP efficiency comprises a ratio of an actual enthalpy drop within the IP section to an enthalpy drop corresponding to an isentropic expansion.

A third aspect of the invention provides a system comprising: a steam turbine; a set of sensors connected to the steam turbine; and at least one computing device configured to estimate an efficiency of an intermediate pressure (IP) section of the steam turbine by performing actions including: receiving measured data from the set of sensors, wherein the measured data includes: a steam temperature and pressure at a high pressure (HP) section inlet, a metal temperature at an IP section outlet; a steam temperature and pressure at an IP section inlet, and a steam temperature and pressure at a low pressure (LP) section admission pipe; using at least one algorithm to calculate at least one of the following: an HP section main steam flow, an IP section main steam flow, a packing steam flow, an IP section admission steam flow, a steam pressure and temperature at the HP section outlet, a crossover pipe steam temperature and a crossover pipe pressure at the IP section outlet; and calculating an estimated IP efficiency of the IP section using the measured data from the sensors and the calculated values from the at least one algorithm, wherein the estimated IP efficiency comprises a ratio of an actual enthalpy drop within the IP section to an enthalpy drop corresponding to an isentropic expansion.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
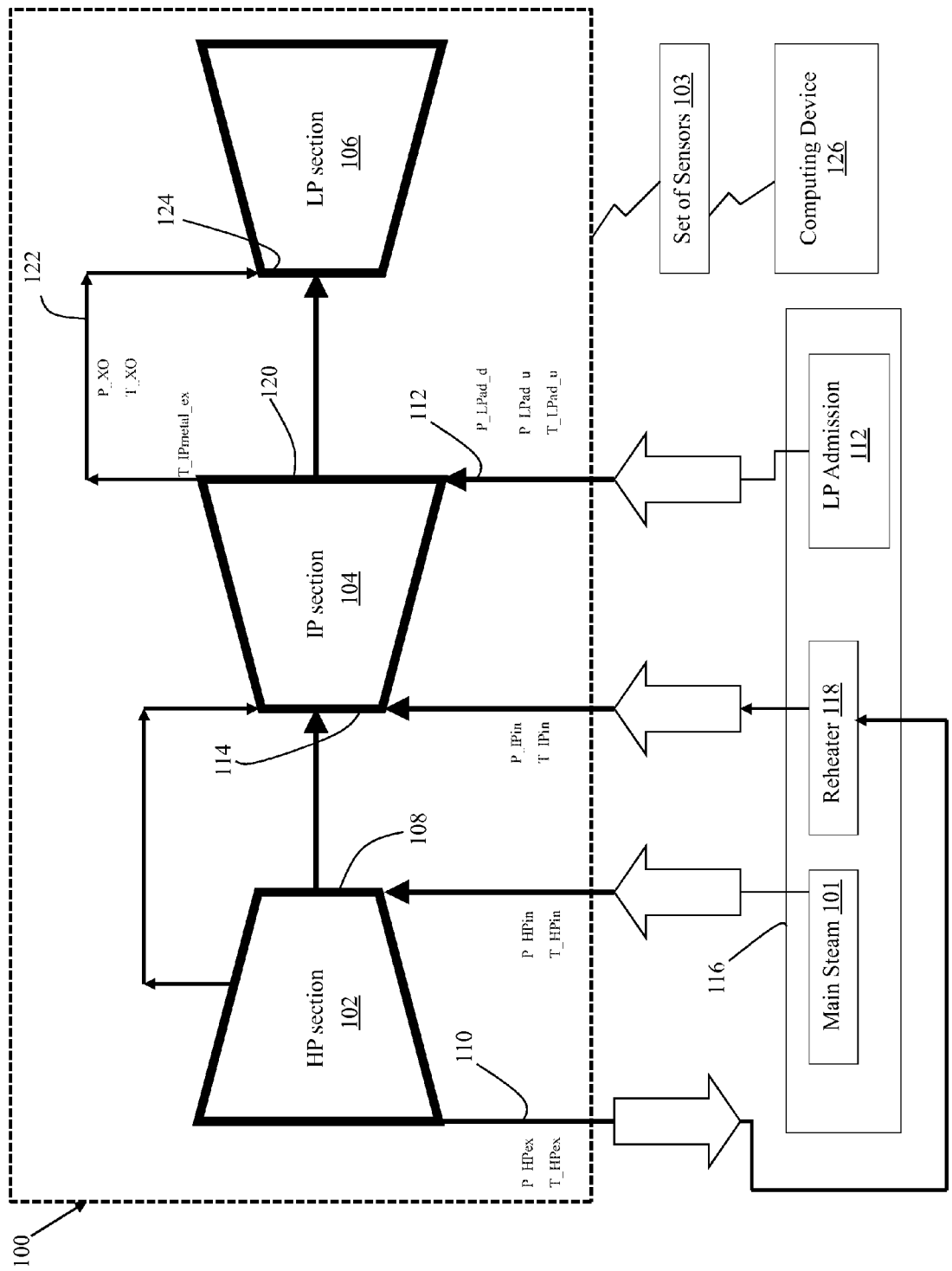
FIG. 1 shows a schematic of certain sections of a steam turbine.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The term "virtual sensors" is used herein to describe the systems and methods disclosed herein to estimate steam turbines' efficiencies when physical sensors are not available. The term "virtual sensors" refers to the use of physics-based models combined with nonlinear filtering techniques, to estimate the values that are not directly measured. These models capture the behavior of different components of the power plant, including all steam turbine sections, admission and crossover pipes, flow junctions, admission and control valves.

In one embodiment, the systems and methods disclosed herein are used to estimate the efficiency of an IP (Intermediate Pressure) section of a steam turbine. It is understood that the methodology discussed herein can also be applied to estimate efficiencies of other sections of a steam turbine, for example, a low pressure (LP) section or a high pressure (HP) section.

Referring to the FIG. 1, a schematic of certain sections of a steam turbine 100 is shown. In FIG. 1, the following abbreviations are used to represent various values either measured by a set of sensors 103 on steam turbine 100, or derived from the "virtual sensors" using algorithms as discussed herein:

P_HPin: HP section inlet pressure
T_HPin: HP section inlet steam temperature
P_HPex: HP section outlet/exhaust pressure
T_HPex: HP section outlet/exhaust steam temperature
P_IPin: IP section inlet pressure
T_IPin: IP section inlet steam temperature
P_LPad_u: LP admission pipe pressure, upstream
T_LPad_u: LP admission pipe temperature, upstream
P_LPad_d: LP admission pipe pressure, downstream
T_IPmetal_ex: IP section outlet/exhaust metal temperature
P_XO: Crossover pipe steam pressure
T_XO: Crossover pipe steam temperature As illustrated in FIG. 1, as one of skill in the art would understand, steam moves through steam turbine 100 from a high pressure (HP) section 102, to an intermediate pressure (IP) section 104 to a low pressure (LP) section 106. A main steam source 101, a reheater steam source 118 and an LP admission 112 are three stages of an HRSG (Heat Recovery Steam Generator) 116 which feeds the steam to HP section 102, to IP section 104 and to LP section 106. Steam enters HP section 102 from main steam source 101, through HP section inlet 108 and then exits at HP section outlet/exhaust 110 and enters reheater 118 for further heating prior to re-admission to IP section inlet 114. From there, a portion of the steam (leakage flow) from HP section 102 enters IP section 104 through IP section inlet 114. In addition, steam from reheater steam source 118 enters IP section 104 through IP section inlet 114. Steam then exits IP section 104 through IP section outlet/exhaust 120 to an adjacent section, i.e., LP section 106 through a crossover pipe 122. Leakage steam also leaves IP section 104 and flows to LP section 106 through IP section outlet/exhaust 120. Fresh steam for LP section inlet 124 can be supplied from LP Admission section 112 of HRSG 116 through LP Admission pipe 112 and crossover pipe 122.

As described herein, a system and method of estimating an efficiency of an IP section of a steam turbine includes receiving measured data from a set of available sensors 103 and then using algorithms (i.e., models) to derive any unavailable data. For example, measured data can include a steam temperature and pressure at the HP section inlet, a metal temperature at the IP section outlet; a steam temperature and pressure at the IP section inlet, and a steam temperature and pressure at the IP section admission pipe. Then, at least one algorithm is provided to calculate a set of derived values, including at least one of the following: an HP section main steam flow, an IP section main steam flow, a packing steam flow, an IP section admission steam flow, a steam pressure and temperature at the HP section outlet, a crossover pipe steam temperature and a crossover pipe pressure at the IP section outlet. As understood by one of skill in the art, a computing device 126 can be provided that can be programmed to calculate the set of derived values.

These measured values and derived values can be used to calculate the estimated efficiency of the IP section. Again, computing device 126 can be configured to receive the set of measured values from the set of sensors 103 and calculate the set of derived values as discussed above, and then use those values to calculate the estimated efficiency. The IP section efficiency, $\eta_{IP}$, is computed as the ratio of the actual enthalpy drop within the IP turbine section to the enthalpy drop corresponding to an isentropic expansion. The actual enthalpy drop within the IP section comprises a difference between an enthalpy at an inlet of the IP section and an enthalpy at an outlet of the IP section. Therefore, the IP section efficiency, $\eta_{IP}$, can be expressed as the following formula:

$$\eta_{IP} = \frac{h_{IPbowl} - h_{IPex}}{h_{IPbowl} - h_{IPexid}}$$

whereas $h_{IPbowl}$ denotes the enthalpy at the IP section inlet, $h_{IPex}$ denotes the enthalpy at an outlet (exhaust) of the IP section, and $h_{IPexid}$ denotes the enthalpy at the IP section exhaust corresponding to an (ideal) isentropic expansion computed from the corresponding energy balances:

$$h_{1st}\omega_{pk} + h_{HRH}\omega_{HRH} = (\omega_{pk} + \omega_{HRH})h_{IPbowl}$$

$$h_{IPex}\omega_{IP} = h_{XO}(\omega_{IP} + \omega_{LPad}) = h_{LPad}\omega_{LPad}$$

Here $h_{1st}$ is the first stage (HP section) enthalpy, $h_{HRH}$ is the enthalpy downstream of a reheater, $h_{XO}$ is the crossover enthalpy, and $h_{LPad}$ is the LP admission enthalpy (upstream, i.e. right before the pressure drop caused by the valve). Also, $\omega_{pk}$ represents the packing leakage steam flow, $\omega_{HRH}$ denotes the steam flow downstream of the reheater, $\omega_{IP}$ denotes the IP section inlet steam flow, and $\omega_{LPad}$ denotes the LP admission steam flow. Finally, $h_{IPexid}$ denotes the enthalpy at the IP section exhaust, corresponding to an (ideal) isentropic expansion. Implicitly assumed here is that the steam turbine is operating in steady state.

IP section efficiency can be corrected for flow through valve and pipes, leakage through packing, natural deterioration (e.g., deposits, solid particle erosions, etc.) and mechanical deterioration (e.g., rub, windage heating, etc.) over a period of time, operating conditions, and/or instrument calibrations. However, often steam turbines in the field do not have all required temperature, pressure and steam flow sensors. Therefore, according to embodiments of this invention, the section steam flow can be derived, i.e., determined using a section steam flow model. The section steam flow model treats the multistage steam turbine section as a single nozzle, and for a new and clean unit, it can be calibrated using acceptance test data and/or rated design values. Additionally, this model has the capability to model the turbine state defined as, for example, but not limited to, operations events, normal deterioration (caused by erosion, deposits, etc.), mechanical deterioration (caused by rub, windage heating, etc.) periodic inspections and repairs, full refurbishment, or instruments drift over time. The term "rub" is used herein to refer to mechanical contact between stationary and rotating components of the turbomachinery, while the term "windage heating" refers to localized heating in a particular zone in a steam turbine section.

As illustrated by the above equations, in order to compute the $\eta_{IP}$, the following information is needed and can be derived using models because each value is a function of other, measured, values. For example:

- $h_{1st}$=f(pressure & temp at HP section inlet, HP section steam path geometry (e.g., unit specific design rated flow, temperature and pressure for a clean new steam path), natural deterioration of the turbine components over time (e.g., using steam turbine product line specific degradation curves), mechanical deterioration of the turbine components over period of time (e.g., rubs and windage heating etc.), operational conditions (e.g., load specific but steady state), instrument drift (e.g., measurement drift of instruments over a period of time));
- $\omega_{pk}$=f(packing geometry (e.g., unit specific design rated flow, temperature and pressure for a clean new packing), natural deterioration over time, mechanical deterioration over time, operational conditions);
- $h_{HRH}$=f(pressure and temperature at a reheater downstream, natural deterioration over time, mechanical deterioration over time, operational conditions, instruments drift);
- $\omega_{HRH}$=f(pipe andand valve geometry (e.g., unit specific design rated flow, temperature and pressure for the pipe and valve), machine specific, natural deterioration over time, mechanical deterioration over time, operational conditions);
- $h_{IPbowl}$=f(pressure & temp at IP section inlet, IP section steam path geometry (e.g., unit specific design rated flow, temperature and pressure for a clean new steam path), natural deterioration over time, mechanical deterioration over time, operational conditions, instruments drift);
- $h_{IPex}$=f(pressure and temperature at IP section exhaust, IP section steam path geometry, natural deterioration over time, mechanical deterioration time, operational conditions, instruments drift);
- $\omega_{IP}$=f(steam path geometry, natural deterioration over time, mechanical deterioration over time, operational conditions);
- $h_{XO}$=f(pressure and temperature at crossover pipe, steam path and pipe geometry, natural deterioration over time, mechanical deterioration over time, operational conditions, instruments drift);
- $h_{LPad}$=f(pressure and temperature at LP section admission inlet, natural deterioration over time, mechanical deterioration over time, operational conditions, instruments drift); and
- $\omega_{LPad}$=f(pipe and valve geometry, natural deterioration over time, mechanical deterioration over time, operational conditions).

In other words, an algorithm to calculate the main HP section steam flow and the main IP section steam flow uses values determined from an IP section inlet steam pressure sensor, an IP section inlet steam temperature sensor and an algorithm to calculate steam leakage flow uses values of main HP section steam flow and main IP section steam flow. In addition, an algorithm to calculate the LP admission steam flow uses values determined from a set of temperature and pressure sensors upstream and downstream of an LP admission valve. The algorithm to calculate a crossover pipe pressure at an exhaust of the IP section, uses a model recognizing that the crossover pipe pressure is a function of a pressure downstream of an LP admission valve and a derived LP admission steam flow, while an algorithm to calculate a crossover pipe temperature at an exhaust of the IP section recognizes that the crossover pipe temperature is a function of a metal temperature at the IP section exhaust and the crossover pipe geometry.

To account for missing measurements as discussed above, one example of a model that can be used is:

$$w = K_{stg}\sqrt{\delta_1 p_1\left[1-\left(\frac{p_2}{p_1}\right)^2\right]} \doteq fm(p_1, t_1, p_2)$$

where $\omega$ denotes the section steam flow, $p_1$ denotes the inlet steam pressure, $t_1$ denotes the inlet steam temperature, $\delta_1$ denotes the inlet steam density and $p_2$ denotes the exhaust steam pressure. $K_{stg}$ represents the stage flow coefficient and can be computed from rated values of $\omega$, $p_1$, $t_1$ and $p_2$. $K_{stg}$ coefficient being calculated using the parameters such as pressure and temperature at the HP section inlet, HP section steam path geometry (e.g., unit specific design rated flow, temperature and pressure for clean new steam path), natural deterioration over time (e.g., using steam turbine product line specific degradation curves), mechanical deterioration over period of time (e.g., number of events like rubs and windage heating etc.), operational conditions (e.g., load specific but steady state), instruments drift (e.g., measurement drift over period of time). This model results from considering the multistage steam turbine section as a single nozzle. Implicitly assumed in the model is a pressure drop across the section, i.e., $p_2/p_1<1$.

Sensors 103 on the steam turbine also typically contain sensors upstream and downstream of the LP admission valve, and these extra sensors can be used together with a valve model to compute the LP admission pipe flow:

$$\omega=C_v\sqrt{[\delta_u(p_u-p_d)]}\doteq fv(p_u,t_u,p_d)$$

where $\omega$ is the steam flow through the valve, $p_u$ denotes upstream steam pressure, $t_u$ denotes the upstream steam temperature, $\delta_u$ denotes the inlet steam density, and $p_d$ denotes the downstream steam pressure. $C_v$ represents the valve conductance, and is a function of the valve opening, ideally the valve characteristic provided by a vendor should be incorporated into its computation. If this information is not available, and using the assumption that the valve is fully open during normal unit operation, $C_v$ can be computed from rated values of $\omega$, $p_u$, $t_u$, and $p_d$, and for a nominal pressure drop $(p_u-p_d)/p_u$. As before, implicitly assumed in the model is a pressure drop across the valve, i.e., $p_u > p_d$. The packing flow can be assumed a constant ratio of the main HP section flow:

$$\omega_{pk}=K_{pk}\omega_{HP}\doteq fl(\omega_{HP})$$

where $\omega_{pk}$ denotes the leakage flow, $\omega_{HP}$ denotes the HP section flow, and $K_{pk}$ denotes the leakage flow coefficient, computed as the ratio between rated leakage flow and rated main HP section flow.

As discussed herein, the crossover temperatures and pressures are also often missing for a steam turbine in the field. In those situations, the missing temperature can be approximated by the metal temperature measurement on the IP exhaust, which amounts to introducing a (small) constant bias error in the steam temperature, in steady state operation. The crossover steam pressure can be recovered by a combination of the valve model that estimates the LP admission flow, and a pipe model that accounts for the pressure drop on the LP admission pipe:

$$\omega=C_p\sqrt{\delta_d(p_d-p_{XO})}\doteq fp(p_d,t_d,p_{XO})$$

where $\omega$ is the steam flow through the pipe (and equal to the one through the valve), $p_d$ denotes the upstream steam pressure, $\delta_d$ denotes the upstream steam density, and $p_{XO}$ denotes the crossover pressure. Similar to $C_v$, $C_p$ represents the pipe conductance, and relates the steam flow between upstream and crossover locations with the pressure drop between these two locations. On a new unit, this constant can be calibrated using acceptance test data or rated design values.

Virtual sensors systems and methods as disclosed herein take the continuous steam turbines operational data from the available field data and process through the model to estimate the steam turbine sectional efficiencies and therefore long term performance trending for the steam turbines. Long term performance trending for the steam turbines allows one to perform the root cause analysis of steam turbine fleet issues, and plan (or defer) an outage for steam turbine fleet. Advance planning reduces the outage period and downtime, resulting in increased revenue from more useful power generation and reduced operation cost. Extending the outage period increases revenue from more useful power generation and increases return on investment for a customer.

It is understood that while methods described herein may be performed using at least one computing device 126, portions or all of the methods described herein may be performed manually. That is, retrieval of the various values from set of sensors 103, computing the set of derived data using the models and algorithms provided, and estimating the efficiency of a steam turbine section may be performed manually (e.g., via hand by a human operator). It is further understood that the processes described herein may, in some embodiments, be periodically repeated (e.g., automatically or by operator prompting) in order to gather and/or compare data relating to efficiencies of the various sections of steam turbine 100.

As will be appreciated by one skilled in the art, the systems and methods described herein may be embodied as a system(s), method(s) or computer program product(s). Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to method steps and/or actions, and it is understood that each step and/or action can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the method description.

Figure 2:
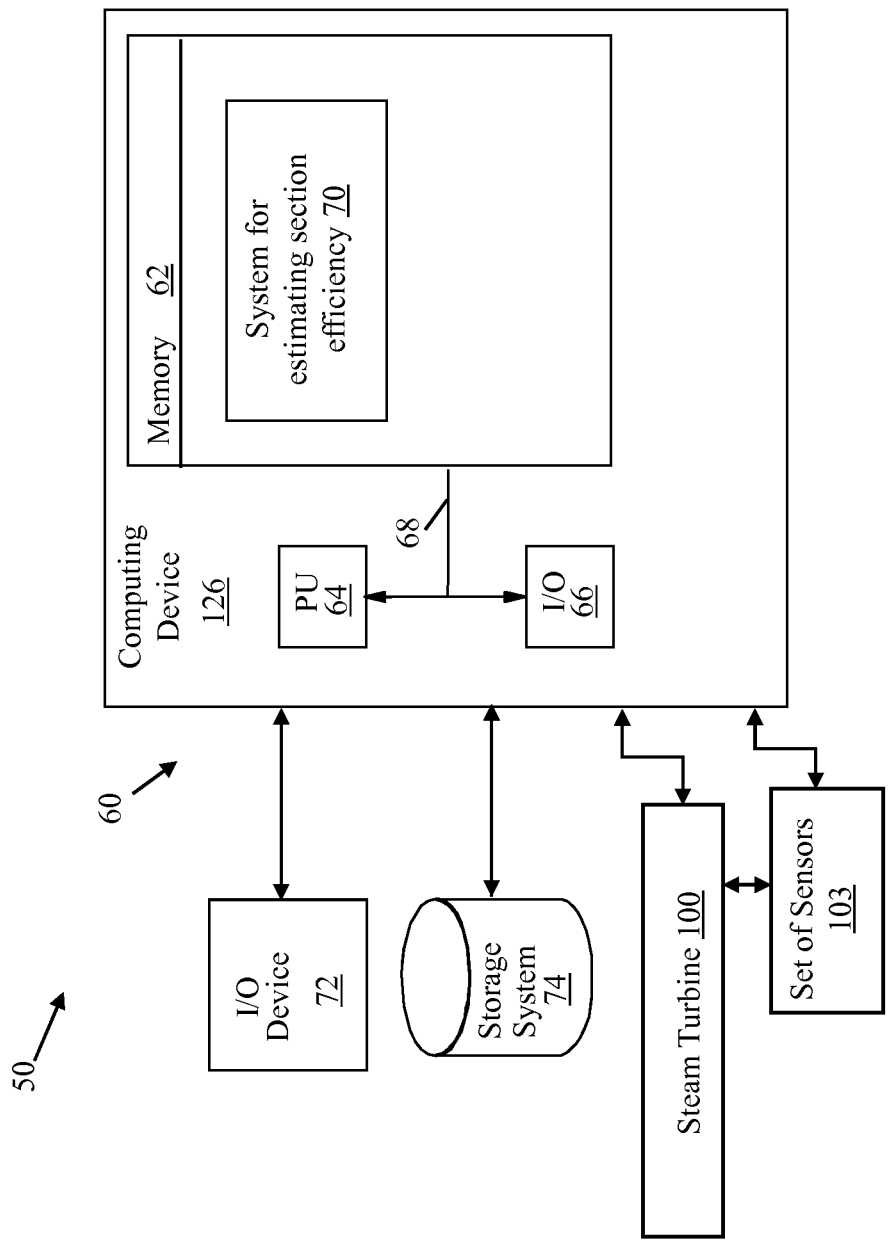
FIG. 2 shows an illustrative environment including a system for estimating steam turbine sectional efficiencies according to embodiments of the invention.

Turning to FIG. 2, an illustrative environment 50 including a system 70 for estimating a steam turbine section efficiency is shown according to embodiments of the invention. Environment 50 includes a computer infrastructure 60 that can perform the various processes described herein. In particular, computer infrastructure 60 is shown including a computing device 126 that comprises the system 70 for estimating a steam turbine section efficiency, which enables computing device 126 to estimate section efficiencies within a power generation system (e.g., steam turbine 100).

Computing device 126 is shown including a memory 62, a processor (PU) 64, an input/output (I/O) interface 66, and a bus 68. Further, computing device 126 is shown in communication with an external I/O device/resource 72 and a storage system 74. As is known in the art, in general, processor 64 executes computer program code, such as system 70 that is stored in memory 62 and/or storage system 74. While executing computer program code, processor 64 can read and/or write data, such as values obtained from set of sensors 103, connected to one or more components in the power generation system 100. Bus 68 provides a communications link between each of the components in computing device 126. I/O device 72 can comprise any device that enables a user to interact with computing device 126 or any device that enables computing device 126 to communicate with one or more other computing devices. Input/output devices (including but not limited to keyboards, displays, pointing devices, etc.) can be coupled to the system either directly or through intervening I/O controllers.

Environment 50 may include the power generation system 100, e.g., steam turbine 100, operably connected to the system 70 for estimating a steam turbine section efficiency through computing device 126 (e.g., via wireless or hard-wired means). It is understood that system 70 for estimating a steam turbine section efficiency may further include conventional transmitters and receivers for transmitting and receiving, respectively, data from the power generation system 100 and/or set of sensors 103.

In any event, computing device 126 can comprise any general purpose computing article of manufacture capable of executing computer program code installed by a user (e.g., a personal computer, server, handheld device, etc.). However, it is understood that computing device 126 and system 70 for estimating a steam turbine section efficiency are only representative of various possible equivalent computing devices that may perform the various process steps of the disclosure. To this extent, in other embodiments, computing device 126 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 60 is only illustrative of various types of computer infrastructures for implementing the disclosure. For example, in one embodiment, computer infrastructure 60 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned and discussed further herein, system 70 for estimating a steam turbine section efficiency has the technical effect of enabling computing infrastructure 60 to perform, among other things, the efficiency estimation functions described herein. It is understood that some of the various components shown in FIG. 2 can be implemented independently, combined, and/or stored in memory for one or more separate computing devices that are included in computer infrastructure 60. Further, it is understood that some of the components and/or functionality may not be implemented, or additional schemas and/or functionality may be included as part of environment 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    at least one computing device configured to estimate an efficiency of a section of a steam turbine by performing actions including:
        determining a set of measurement data obtained directly from a set of sensors on the steam turbine, via a processor, wherein the measurement data includes: a steam temperature and pressure at a first section inlet, a steam temperature and pressure at a second section inlet, a metal temperature at a second section outlet and a steam temperature and pressure at a third section admission pipe;
        determining a set of derived data relating to measurements that cannot be obtained directly from the set of sensors, via the processor, wherein the set of derived data includes: a first section main steam flow, a second section main steam flow, a packing steam flow, a third section admission pipe steam flow, a steam pressure and temperature at the first section outlet, a steam temperature and a crossover pipe pressure at the second section outlet; and
        estimating the efficiency of the second section, via the processor, using the set of measurement data and the set of derived data,
    wherein the first section has a pressure that is greater than a pressure of the second section.

2. The system of claim 1, wherein the estimated efficiency of the second section comprises a ratio of an actual enthalpy drop within the second section to an enthalpy drop corresponding to an isentropic expansion.

3. The system of claim 2, wherein the enthalpy drop within the second section comprises a difference between an enthalpy at an inlet of the second section and an enthalpy at an outlet of the second section.

4. The system of claim 1, wherein the second section comprises a low pressure, high pressure or intermediate pressure section of the steam turbine.

5. A system comprising:
    at least one computing device configured to estimate an efficiency of an intermediate pressure (IP) section of a steam turbine by performing actions including:
        receiving measured data from at least one sensor on the steam turbine, via a processor, wherein the measured data includes: a steam temperature and pressure at a high pressure (HP) section inlet, a metal temperature at an IP section outlet; a steam temperature and pressure at an IP section inlet, and a steam temperature and pressure at a low pressure (LP) section admission pipe;
        using at least one algorithm, via the processor, to calculate at least one of the following: an HP section main steam flow, an IP section main steam flow, a packing steam flow, an IP section admission steam flow, a steam pressure and temperature at the HP section outlet, a crossover pipe steam temperature and a crossover pipe pressure at the IP section outlet; and calculating an estimated IP efficiency of the IP section, via the processor, using the measured data from the sensors and the calculated values from the at least one algorithm, wherein the estimated IP efficiency comprises a ratio of an actual enthalpy drop within the IP section to an enthalpy drop corresponding to an isentropic expansion.

6. The system of claim 5, wherein the actual enthalpy drop within the IP section comprises a difference between an enthalpy at an inlet of the IP section and an enthalpy at an outlet of the IP section.

7. The system of claim 6, wherein the enthalpy at the IP section inlet and the enthalpy at the IP section outlet are calculated using the following formulas:

$$h_{1st}\omega_{pk}+h_{HRH}\omega_{HRH}=(\omega_{pk}+\omega_{HRH})h_{IPbowl}$$

$$h_{IPex}\omega_{IP}=h_{XO}(\omega_{IP}+\omega_{LPad})=h_{LPad}\omega_{LPad}$$

wherein, h1st denotes an enthalpy in the HP section of the steam turbine, hHRH denotes an enthalpy downstream of a reheater, hXO denotes an enthalpy in a crossover pipe, hLPad denotes an enthalpy at the IP section admission area, ωpk denotes a packing leakage steam flow, ωHRH denotes a flow downstream of the reheater, wIP denotes a steam flow at the IP section inlet, ωLPad denotes a steam flow at the IP section admission area, and hIPexid denotes an enthalpy at the IP section outlet, corresponding to an isentropic expansion.

8. The system of claim 5, wherein the at least one algorithm includes a model to calculate the HP main section steam flow and the IP main section steam flow as a function of an IP section inlet steam pressure, an IP section inlet steam temperature, an IP section exhaust metal temperature, and at least one of: steam path geometry, natural deterioration of turbine components over time, mechanical deterioration of the turbine components over period of time, operational conditions of the turbine, and instrument drift.

9. The system of claim 5, wherein the at least one algorithm includes a model to calculate a steam leakage flow as a function of the HP main section steam flow, the IP main section steam flow, and at least one of:

packing geometry, natural deterioration of turbine components over time, mechanical deterioration of the turbine components over period of time, operational conditions of the turbine, and instrument drift.

10. The system of claim 5, wherein the at least one algorithm to calculate the LP admission steam flow uses values determined from a set of temperature and pressure sensors upstream and downstream of an LP admission valve, and wherein the LP admission steam flow is further a function of at least one of: pipe geometry, natural deterioration of turbine components over time, mechanical deterioration of the turbine components over period of time, operational conditions of the turbine, and instrument drift.

11. The system of claim 5, wherein the at least one algorithm includes a model to calculate a crossover pipe pressure at an exhaust of the IP section, wherein the crossover pipe pressure is a function of a pressure downstream of an LP admission valve, a derived LP admission steam flow and at least one of: steam path geometry, natural deterioration of turbine components over time, mechanical deterioration of the turbine components over period of time, operational conditions of the turbine, and instrument drift.

12. The system of claim 5, wherein the at least one algorithm includes a model to calculate a crossover pipe temperature at an exhaust of the IP section, wherein the crossover pipe temperature is a function of a metal temperature at the IP section exhaust, the crossover pipe geometry and at least one of: steam path geometry, natural deterioration of turbine components over time, mechanical deterioration of the turbine components over period of time, operational conditions of the turbine, and instrument drift.

13. A system comprising:
a steam turbine;
a set of sensors connected to the steam turbine; and
at least one computing device configured to estimate an efficiency of an intermediate pressure (IP) section of the steam turbine by performing actions including:
receiving measured data from the set of sensors, wherein the measured data includes: a steam temperature and pressure at a high pressure (HP) section inlet, a metal temperature at an IP section outlet; a steam temperature and pressure at an IP section inlet, and a steam temperature and pressure at a low pressure (LP) section admission pipe;
using at least one algorithm to calculate at least one of the following: an HP section main steam flow, an IP section main steam flow, a packing steam flow, an IP section admission steam flow, a steam pressure and temperature at the HP section outlet, a crossover pipe steam temperature and a crossover pipe pressure at the IP section outlet; and
calculating an estimated IP efficiency of the IP section using the measured data from the sensors and the calculated values from the at least one algorithm, wherein the estimated IP efficiency comprises a ratio of an actual enthalpy drop within the IP section to an enthalpy drop corresponding to an isentropic expansion.

14. The system of claim 13, wherein the actual enthalpy drop within the IP section comprises a difference between an enthalpy at an inlet of the IP section and an enthalpy at an outlet of the IP section.

15. The system of claim 14, wherein the enthalpy at the IP section inlet and the enthalpy at the IP section outlet are calculated using the following formulas:

$$h_{1st}\omega_{pk}+h_{HRH}\omega_{HRH}=(\omega_{pk}+\omega_{HRH})h_{IPbowl}$$

$$h_{IPex}\omega_{IP}=h_{XO}(\omega_{IP}+\omega_{LPad})=h_{LPad}\omega_{LPad}$$

wherein, h1st denotes an enthalpy in the HP section of the steam turbine, hHRH denotes an enthalpy downstream of a reheater, hXO denotes an enthalpy in a crossover pipe, hLPad denotes an enthalpy at the IP section admission area, ωpk denotes a packing leakage steam flow, ωHRH denotes a flow downstream of the reheater, wIP denotes a steam flow at the IP section inlet, ωLPad denotes a steam flow at the IP section admission area, and hIPexid denotes an enthalpy at the IP section outlet, corresponding to an isentropic expansion.

16. The system of claim 13, wherein the at least one algorithm includes a model to calculate the HP main section steam flow and the IP main section steam flow as a function of an IP section inlet steam pressure, an IP section inlet steam temperature, an IP section exhaust metal temperature, and at least one of: steam path geometry, natural deterioration of turbine components over time, mechanical deterioration of the turbine components over period of time, operational conditions of the turbine, and instrument drift.

17. The system of claim 13, wherein the at least one algorithm includes a model to calculate a steam leakage flow as a function of the HP main section steam flow, the IP main section steam flow, and at least one of: packing geometry, natural deterioration of turbine components over time, mechanical deterioration of the turbine components over period of time, operational conditions of the turbine, and instrument drift.

18. The system of claim 13, wherein the at least one algorithm to calculate the LP admission steam flow uses values determined from a set of temperature and pressure sensors upstream and downstream of an LP admission valve, and wherein the LP admission steam flow is further a function of at least one of: pipe geometry, natural deterioration of turbine components over time, mechanical deterioration of the turbine components over period of time, operational conditions of the turbine, and instrument drift.

19. The system of claim 13, wherein the at least one algorithm includes a model to calculate a crossover pipe pressure at an exhaust of the IP section, wherein the crossover pipe pressure is a function of a pressure downstream of an LP admission valve, a derived LP admission steam flow and at least one of: steam path geometry, natural deterioration of turbine components over time, mechanical deterioration of the turbine components over period of time, operational conditions of the turbine, and instrument drift.

20. The system of claim 13, wherein the at least one algorithm includes a model to calculate a crossover pipe temperature at an exhaust of the IP section, wherein the crossover pipe temperature is a function of a metal temperature at the IP section exhaust, the crossover pipe geometry and at least one of: steam path geometry, natural deterioration of turbine components over time, mechanical deterioration of the turbine components over period of time, operational conditions of the turbine, and instrument drift.

* * * * *